United States Patent
Grosz et al.

(10) Patent No.: US 10,884,659 B2
(45) Date of Patent: Jan. 5, 2021

(54) HOST TIMEOUT AVOIDANCE IN A MEMORY DEVICE

(71) Applicant: Micron Technology, Inc., Boise, ID (US)

(72) Inventors: Nadav Grosz, Broomfield, CO (US); David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 62 days.

(21) Appl. No.: 16/023,177

(22) Filed: Jun. 29, 2018

(65) Prior Publication Data

US 2020/0004459 A1 Jan. 2, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ....... G06F 3/0622; G06F 3/0659; G06F 3/067
See application file for complete search history.

(56) References Cited

U.S. PATENT DOCUMENTS

| | | | | |
|---|---|---|---|---|
| 6,484,217 | B1* | 11/2002 | Fuente | G06F 3/0614 709/213 |
| 8,307,031 | B1* | 11/2012 | Grieve | H04L 69/28 709/203 |
| 2010/0254235 | A1* | 10/2010 | Ikeda | G06F 11/004 369/47.15 |
| 2012/0271380 | A1* | 10/2012 | Roberts | A61N 1/37252 607/60 |
| 2017/0115891 | A1* | 4/2017 | O'Krafka | G06F 3/0604 |
| 2017/0308398 | A1* | 10/2017 | Pinto | G06F 3/0608 |
| 2018/0210650 | A1* | 7/2018 | Alexeev | G06F 3/0604 |
| 2018/0217794 | A1* | 8/2018 | Yamamoto | G06F 3/122 |
| 2018/0293191 | A1* | 10/2018 | Li | G06F 13/16 |

* cited by examiner

*Primary Examiner* — Nanci N Wong
(74) *Attorney, Agent, or Firm* — Schwegman Lundberg & Woessner, P.A.

(57) ABSTRACT

Devices and techniques for host timeout avoidance in a memory device are disclosed herein. A memory device command is received with a memory device from a host. A determination is made, with the memory device, of a host timeout interval associated with the received memory device command. A timer of the memory device is initialized to monitor a time interval from receipt of the memory device command. After partially performing the memory device command, a response to the host before the memory device timer interval reaches the host timeout interval is generated by the memory device.

12 Claims, 5 Drawing Sheets

HOST TIMEOUT AVOIDANCE IN A MEMORY DEVICE

BACKGROUND

Memory devices are typically provided as internal, semiconductor, integrated circuits in computers or other electronic devices. There are many different types of memory, including volatile and non-volatile memory. Flash memory is utilized as non-volatile memory for a wide range of electronic applications. Flash memory devices typically include one or more groups of floating gate, or charge trap memory cells that allow for high memory densities, high reliability, and low power consumption. Two common types of flash memory array architectures include NAND and NOR architectures, named after the logic form in which the basic memory cell configuration of each is arranged.

A host associated with the memory devices may, in some cases, reset the memory devices when a given command issued by the host times out or exceeds a host timeout interval. In some cases, such reset commands are issued prematurely when the memory devices have not crashed and are still working on a given memory command. This introduces inefficiencies and wastes resources as the host may need to re-issue the previous memory device command after resetting the memory device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
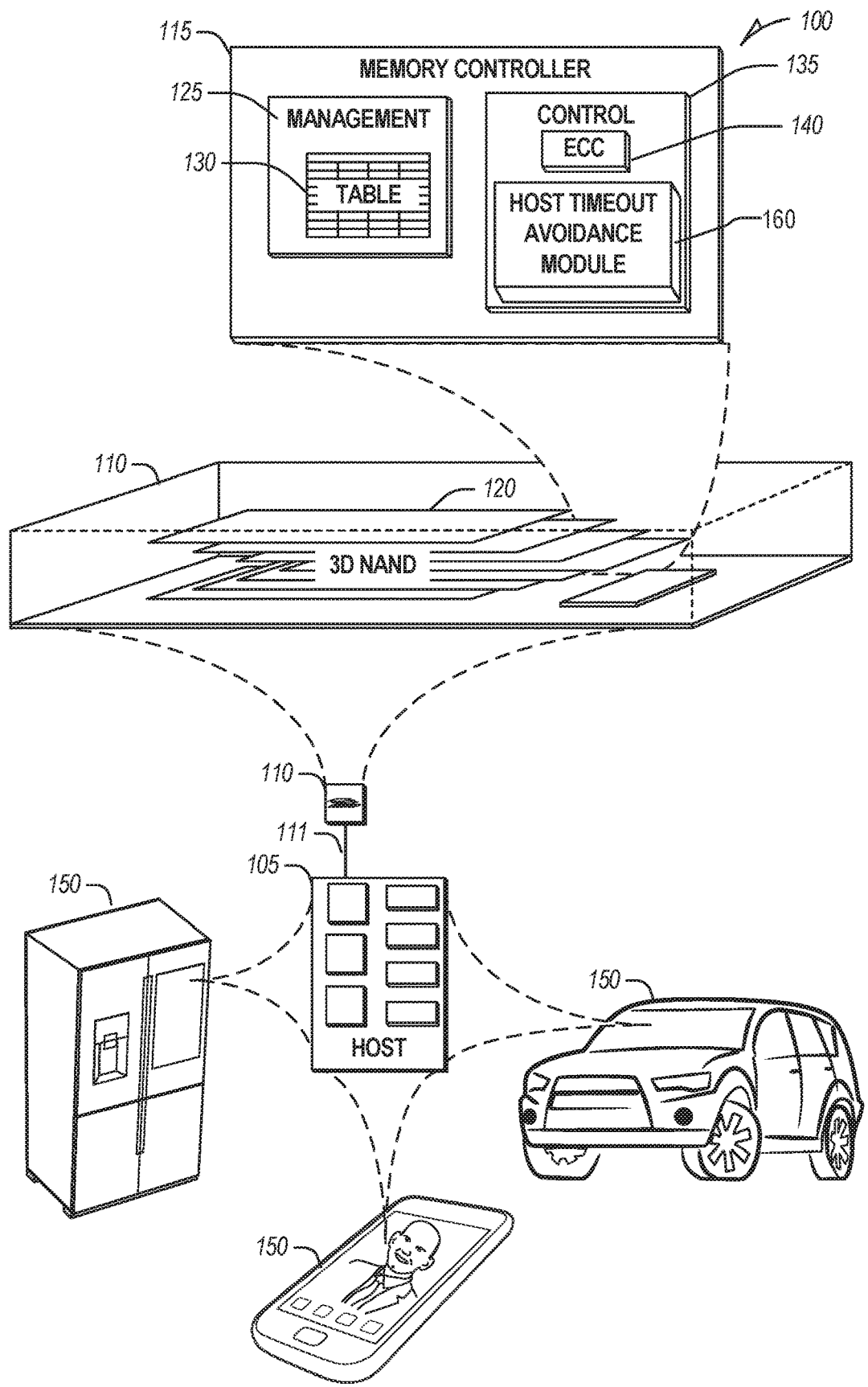
FIG. 1 illustrates an example of an environment including a memory device upon which one or more embodiments may be implemented.

This document addresses various techniques for configuring and operating a memory device timer of a host timeout avoidance module in, or associated with, one or more memory devices in response to operations of the system into which the memory is incorporated. This document discusses various techniques for determining a host timeout interval (e.g., when a host resets the memory device) relative to receipt of memory operation commands to generate a response to the host after partially performing the memory device operation and before the memory device timer reaches the host timeout interval. As referred to herein, memory devices may include the memory array cells, memory controllers, dies on which the memory array and other memory components are implemented, and any other component used to store or retrieve information or that assists a storage element to perform storage or retrieval operations.

The host timeout avoidance module may track how long different classes of memory device operations are performed by the memory device before the host times out and issues a reset signal to the memory device. These different intervals are stored as different host timeout intervals. When a given memory device operation is received by the memory device, the host timeout avoidance module may determine the class of the memory device operation. The host timeout avoidance module may retrieve the host timeout interval associated with the received memory device command class and may initialize a timer with the retrieved host timeout interval. When the memory device timer reaches or is about to reach the host timeout interval, the host timeout avoidance module generates a response to the host after partially performing the given memory device command (and before completing the given memory device command). The response may include partial data corresponding to the memory device command or an indication that the memory device is still processing the given memory device command.

In response to receiving the response from the host timeout avoidance module, the host may reset a host timeout timer and avoid resetting the memory device. This allows the memory device to continue operating on the previous memory device command even though such a command has been pending completion past the host timeout interval. Typically, a host resets the memory device when the command is pending completion beyond a given host timeout interval which wastes resources and is inefficient in cases where the memory device is still working on the memory device operation. The transmission of the response before the host times out to prevent the host from timing out and sending the reset signal while the memory device is operating on a given command avoids such inefficiencies and waste of resources which provides a significant technical improvement over traditional systems. An example structure and functionality for a host timeout avoidance module will be discussed in detail in reference to FIGS. 2 and 4, later herein.

FIG. 1 illustrates an example of an environment 100 including a host 105 and a memory device 110 configured to communicate over a communication interface 111. The host 105 and/or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor).

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host 105 can include a host system, an electronic device, a processor, a CPU, a memory card reader, or one or more other electronic devices external to the memory device 110. In some examples, the host 105 may be a machine having some portion, or all, of the components discussed in reference to the machine 500 of FIG. 5. Data may be transferred between the memory device 110 and other components over an input/output (I/O) bus.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. The memory controller 115 may include a command queue (not shown) that tracks memory commands received from a host. Commands in the queue may be executed by controller 115 in a first-in first-out (FIFO) manner, stack manner, out of sequence, according to priority, or in any other suitable order.

The described memory device 110 includes a host timeout avoidance module 160 in association with the memory array 120. The host timeout avoidance module 160 may be configured to generate and transmit a response signal to the host 105 (e.g., over interface 111) before a memory device timer reaches a given host timeout interval and after a given memory device operation has been partially performed. For example, the host timeout avoidance module 160 may transmit the response signal a predetermined amount of time before a host timeout signal is expected to be received from host 105 (e.g., a predetermined amount of time before an estimated host timeout interval) after some but not all of the blocks of a read operation have been retrieved or read. This results in the memory device 110 informing the host 105 that a given memory device command is still being performed or has been partially performed and avoiding the host 105 issuing a host reset signal (e.g., because the memory device command exceeds a host timeout interval from the time the memory device command was issued by the host).

In some implementations, controller 115 of memory device 110 may include control circuitry configured to implement the functions of host timeout avoidance module 160. In other implementations, host timeout avoidance module 160 may include an independent control circuitry for implementing the described functionality. In yet other implementations, control circuitry may be divided between host timeout avoidance module 160 and controller 115 to implement the described functions of host timeout avoidance module 160. In the depicted example, the array controller 135 forms a portion of the memory controller 115, and the host timeout avoidance module 160 forms a portion of the array controller.

The host avoidance module 160 may be physically anywhere external to host 105 including inside or outside of the memory device 110. For example, the host timeout avoidance module 160 may be external and/or outside a memory device, memory device die, or may be included on the memory device die, or, for example on a logic die physically associated with the memory die. For example, host timeout avoidance module 160 may be external, and/or outside of array controller 135. For example, host timeout avoidance module 160 (or any individual components thereof), may be an independent component coupled to one or more components in environment 100. For example, host timeout avoidance module 160 may be a separate device on a separate die from that on which memory device 110 is implemented and that on which host 105 is implemented. In cases where host timeout avoidance module 160 is implemented outside of array controller 135, host timeout avoidance module 160 may communicate with components (e.g., a command queue) on the memory device to obtain memory operation commands status information from memory device 110. An exemplary implementation of host timeout avoidance module 160 is described below in connection with FIG. 2.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

The memory manager 125 can include a set of management tables 130 configured to maintain various information associated with one or more components of the memory device 110 (e.g., various information associated with a memory array or one or more memory cells coupled to the memory controller 115). For example, the management tables 130 can include information regarding block age, block erase count, error history, error parameter information, host reset timeout interval(s), or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things. The management table 130 may also keep track of, store, and monitor a number of times the value of the timer of host timeout avoidance module 160 changed, the last time the value was changed, and the timestamp of one or more commands or reset signals.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device.

Figure 2:
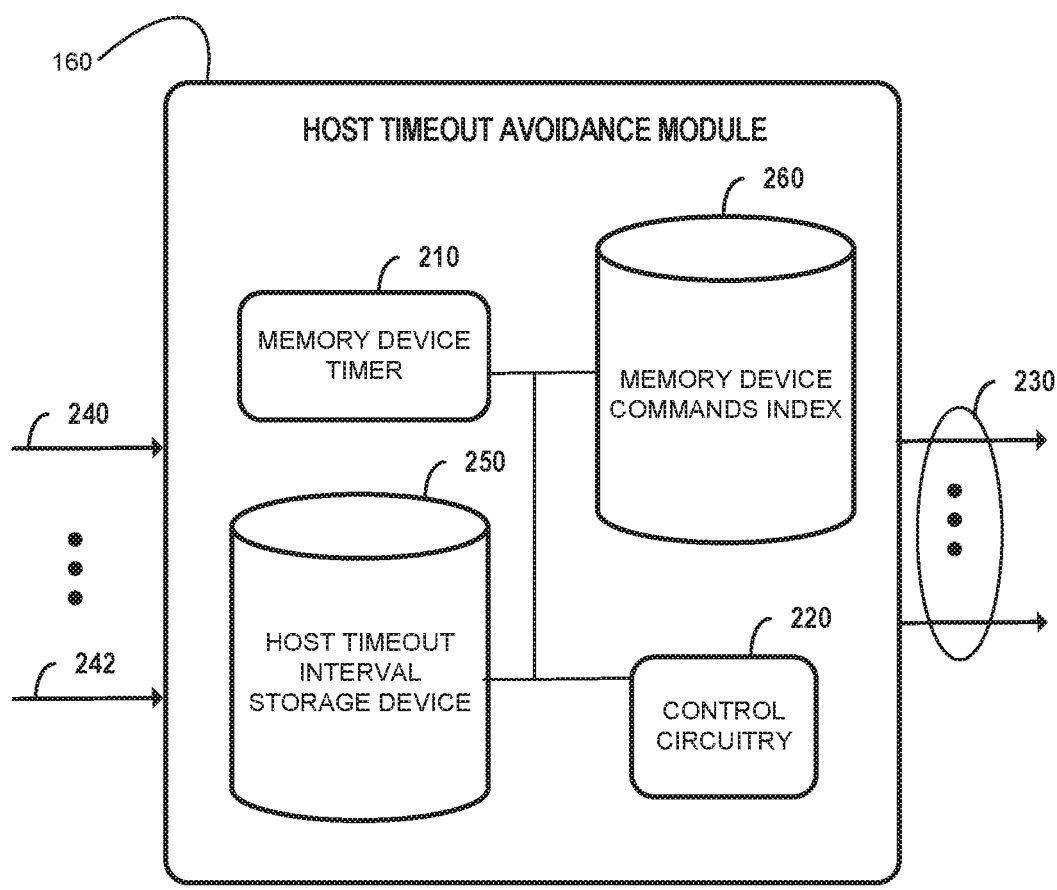
FIG. 2 is a block diagram illustrating an example of a host timeout avoidance module upon which one or more embodiments may be implemented.

FIG. 2 is a block diagram illustrating an example of host timeout avoidance module 160, upon which one or more embodiments may be implemented. Example host timeout avoidance module 160 includes a memory device timer 210, a memory device commands index 260, a host timeout interval storage device 250, and control circuitry 220.

Memory device timer 210 may include a free running timer circuit or may implement functionality of a free running timer that starts counting from 0 or some other preset value to another target value each time the timer is reset or reaches the target value. Setting memory device timer 210 includes setting the value of the target value. In some implementations, the memory device timer 210 may, upon reaching the target value (e.g., when the timer equals the target value or is within a threshold amount of the target value), instruct control circuitry 220 to generate a response 230 to host 105 by issuing an interrupt signal to control circuitry 220. The response 230 may be generated and transmitted by control circuitry 220 to the host 105 after partially completing a given memory device operation. In some implementations, the response 230 may be generated before starting performance of the given memory device command.

Memory device commands index 260 and host timeout interval storage device 250 are each implemented using a physical storage device (e.g., any suitable volatile or non-volatile storage circuitry, such as a NAND, NOR or SSD storage device) and may optionally be combined into the same physical storage device. Memory device commands index 260 is configured to receive and store memory device commands received from the memory controller and/or directly from the host device. Host timeout interval storage device 250 is configured to receive and store one or more host timeout intervals from control circuitry 220 for control circuitry 220 to retrieve and set memory device timer 210. Control circuitry 220 may be implemented by any suitable dedicated circuitry, programmable device, or processor, such as a general purpose processor, configured to perform the functions of host timeout avoidance module 160 in accordance with the process discussed in FIG. 4.

Host timeout avoidance module 160 may receive host reset signal 240 and memory device operation commands 242. Host reset signal 240 may be received directly from the host 105, or in some examples may be provided by a memory controller 115, either indicating that the host reset signal was received from the host 105 or the timestamp associated with such a host reset signal. Memory device operation commands 242 may be provided directly to host timeout avoidance module 160 from host 105 or may be provided by a memory controller or command queue of the memory device 110. Commands 242 may include only the timestamp and class of a given command (rather than the data or command itself) and an indication of whether the command is newly received from the host or has been completed by the memory device. For example, the class included in commands 242 may include any information identifying a given type of memory operation or set of operations, such as a multiple block read/write command, a single block read/write command, a multiple page read/write command, a single page read/write command. Commands 242 may include all of the contents of a command received from the host 105 and in such circumstances host timeout avoidance module 160 may process the commands to extract the class of the command and generate a timestamp for the command class.

Memory device timer 210 may start counting time from zero each time a reset signal is received from control circuitry 220, each time a new command is received, or each time a command completes being executed by the memory device 110. Upon reaching the timer value, memory device timer 210 will generate a signal or interrupt to control circuitry 220. In response, control circuitry 220 transmits a response 230 to the host 105 after a given memory device operation command corresponding to the class has partially been performed. In some implementations, multiple timers 210 may be included in host timeout avoidance module 160, each associated with a different respective class of memory device operations. In such circumstances, each memory device timer 210 may generate a separate interrupt signal for transmission of a corresponding response 230 to the host 105. Each of the multiple timers 210 may operate using the same or different timer values.

Below is a detailed discussion of the operation of the host timeout avoidance module 160 in relation to four different classes of memory device operations, including a multiple block read command, a single block read command, a multiple block write command, and a single block write command. As demonstrated by the below examples, different command classes may be associated with different timers because of the difference in the host timeout intervals associated with the classes.

For example, a host timeout interval for a multiple block read command (one command class) may be longer than a single block read command (another command class). In such circumstances, one memory device timer 210 may be associated with multiple block read commands class and a second memory device timer 210 may be associated with single block read commands class. In response to receiving a multiple block read command, the memory device timer associated with multiple block read commands may be initialized with the corresponding multiple block read command host timeout interval. For example, control circuitry 220 retrieves the host timeout interval from host timeout interval storage device 250, sets the target value of the memory device timer 210 with the retrieved interval and initiates the memory device timer 210. When the memory device timer associated with multiple block read commands reaches the target value (or is within a threshold of the target value), the memory device timer associated with multiple block read commands may issue a first type of interrupt to control circuitry 220. This interrupt may instruct control circuitry 220 to obtain from the page buffer 322 (FIG. 3) of the memory device, the current block or set of blocks already read from the memory array. The current block or set of blocks may be less than the complete set of blocks specified in the multiple block read command. Control circuitry 220 transmits to the host 105 as the response 230 the portion of the blocks in the page buffer 322 before completing reading the remaining blocks associated with the multiple block read command in response to receiving the interrupt from the memory device timer 210.

In another example, in response to receiving a single block read command, the other memory device timer associated with single block read commands may be initialized with the corresponding single block read command host timeout interval. For example, control circuitry 220 may retrieve the host timeout interval from host timeout interval storage device 250, set the target value of the memory device timer 210 with the retrieved interval, and initiate the memory device timer 210. When the memory device timer associated with single block read commands reaches the target value (or is within a threshold of the target value), the memory device timer 210 may issue a second type of interrupt to control circuitry 220. In response to receiving the second type of interrupt, control circuitry 220 obtains a portion of the pages read from the single block (which may be less than all of the pages requested by the command) and transmits the response 230 of the obtained portion to the host 105. In some implementations, in response to receiving the second type of interrupt, control circuitry 220 also transmits a response 230 to the host 105 indicating that the single block read operation is still being performed.

For example, a host timeout interval for a multiple block write command (one command class) may be longer than a single block write command (another command class). In such circumstances, one memory device timer 210 may be associated with multiple block write command classes and a second memory device timer 210 may be associated with single block write commands. In response to receiving a multiple block write command, the memory device timer associated with multiple block write commands may be set with the corresponding multiple block write command host timeout interval stored in host timeout interval storage device 250 and initiated by control circuitry 220. When the memory device timer associated with multiple block write commands reaches the target value (or is within a threshold of the target value), the memory device timer associated with multiple block write commands may issue a third type of interrupt to control circuitry 220. This third type of interrupt may instruct control circuitry 220 to transmit as the response 230 to the host 105 an indication that the multiple block write operation is still being performed.

In another example, in response to receiving a single block write command, the other memory device timer associated with single block write commands may be set with the corresponding single block write command host timeout interval stored in host timeout interval storage device 250 and initiated by control circuitry 220. When the memory device timer associated with single block write commands reaches the target value (or is within a threshold of the target value), the memory device timer associated with single block write commands may issue the third type of interrupt to control circuitry 220. In response to receiving the third type of interrupt, control circuitry 220 transmits as the response 230 a signal to the host 105 indicating that the single block write operation is still being performed.

The host timeout interval stored in host timeout interval storage device 250 may be dynamically determined based on the receipt of host timeout resets. In some cases, the host timeout interval stored in host timeout interval storage device 250 may be updated each time a host timeout reset signal is received. In some cases, the host timeout interval stored in host timeout interval storage device 250 may be updated after a threshold number of reset signals are received for a given command or class of commands. To set or update the values stored in host timeout interval storage device 250, control circuitry 220 monitors received commands 242 and their timestamps relative to timestamps of received host timeout reset signals. For example, in response to receiving a command 242, control circuitry 220 obtains a timestamp for the command and stores the command along with the timestamp in memory device commands index 260. In some implementations, control circuitry 220 may generate a unique identifier for the received command and associate that identifier with the generated timestamp for storage in memory device commands index 260. In some implementations, control circuitry 220 determines a class of the received command and associates that class with the generated timestamp for storage in memory device commands index 260. Control circuitry 220 may continue processing commands 242 in a similar manner until a threshold number of commands or classes of commands are stored in memory device commands index 260. In some implementations, after a given command completes or after a given class of commands complete being executed, the command or class of commands is removed from memory device commands index 260.

In some implementations, control circuitry 220 may detect a reset signal 240 being received. In some implementations, control circuitry 220 may search memory device commands index 260 to identify the oldest or newest command or class of command stored in memory device commands index 260 (e.g., the command with the oldest or newest timestamp or the class of command with the oldest or newest timestamp). Control circuitry 220 may compute a new timestamp of reset signal 240 and compare the computed new timestamp to the identified oldest or newest command or class of commands stored in memory device commands index 260. Based on this comparison, control circuitry 220 determines an estimated host timeout interval of the host 105. Control circuitry 220 may store the determined estimated host timeout interval of the host in host timeout interval storage device 250. In some implementations, host timeout interval storage device 250 may include a table of different command classes. In such circumstances, control circuitry 220 may store the estimated host timeout interval in the entry in the table corresponding to the oldest or newest class of commands.

For example, control circuitry 220 may receive a first command 242 to perform a multiple block read operation. In response, control circuitry 220 determines the class of the first command is a multiple block read. Control circuitry 220 may search memory device commands index 260 for a matching class. In some implementations, if a class that matches the class of the first command is found, control circuitry 220 may reset or clear the timestamp of the matching class from memory device commands index 260 (e.g., to measure a host timeout interval between the newest command class and a reset signal). In some implementations, if a class that matches the class of the first command is found, control circuitry 220 may discard the first command class and continue monitoring for a host reset signal based on the previously stored class to determine the host timeout interval (e.g., to measure a host timeout interval between the oldest command class and a reset signal). In some implementations, if the class of the first command 242 is not found in memory device commands index 260, control circuitry 220 may store the first class and the timestamp of the first command 242 indicating when the first command 242 was received.

For example, control circuitry 220 may receive a second command 242 to perform a single block read operation. In response, control circuitry 220 determines the class of the second command is a single block read. Control circuitry 220 may search memory device command index 260 for a matching class. In some implementations, if a class that matches the class of the second command is found, control circuitry 220 may reset or clear the timestamp of the matching class from memory device commands index 260 (e.g., to measure a host timeout interval between the newest command class and a reset signal). In some implementations, if a class that matches the class of the second command is found, control circuitry 220 may discard the second command class and continue monitoring for a host reset signal based on the previously stored class to determine the host timeout interval (e.g., to measure a host timeout interval between the oldest command class and a reset signal). In some implementations, if the class of the second command 242 is not found in memory device commands index 260, control circuitry 220 may store the second class and the timestamp of the second command 242 indicating when the second command 242 was received.

After storing the first and second command classes in memory device commands index 260, control circuitry 220 detects a reset signal 240. In response, control circuitry 220 computes a timestamp of the reset signal. Control circuitry 220 may search memory device commands index 260 for the oldest time stamp. For example, control circuitry 220 may determine that the first class of commands has an earlier timestamp than the second class of commands. In response, control circuitry 220 computes a difference between the timestamp of the first class of commands and the timestamp of the reset signal 240. Control circuitry 220 stores this difference in host timeout interval storage device 250 in a table entry corresponding to the first class of commands. In some implementations, control circuitry 220 searches memory device commands index 260 for the newest time stamp. For example, control circuitry 220 may determine that the second class of commands has a later timestamp than the first class of commands. In response, control circuitry 220 computes a difference between the timestamp of the second class of commands and the timestamp of the reset signal 240. Control circuitry 220 may store this difference in host timeout interval storage device 250 in a table entry corresponding to the second class of commands.

In some implementations, the reset signal 240 may identify a given command or class of commands that resulted in the host timeout reset signal 240 being generated. In such circumstances, control circuitry 220 may search memory device commands index 260 for the class or command identified by reset signal 240 and may compute the difference between their respective timestamps to determine the host timeout interval for the command or class of commands for storage in host timeout interval storage device 250.

Figure 3:
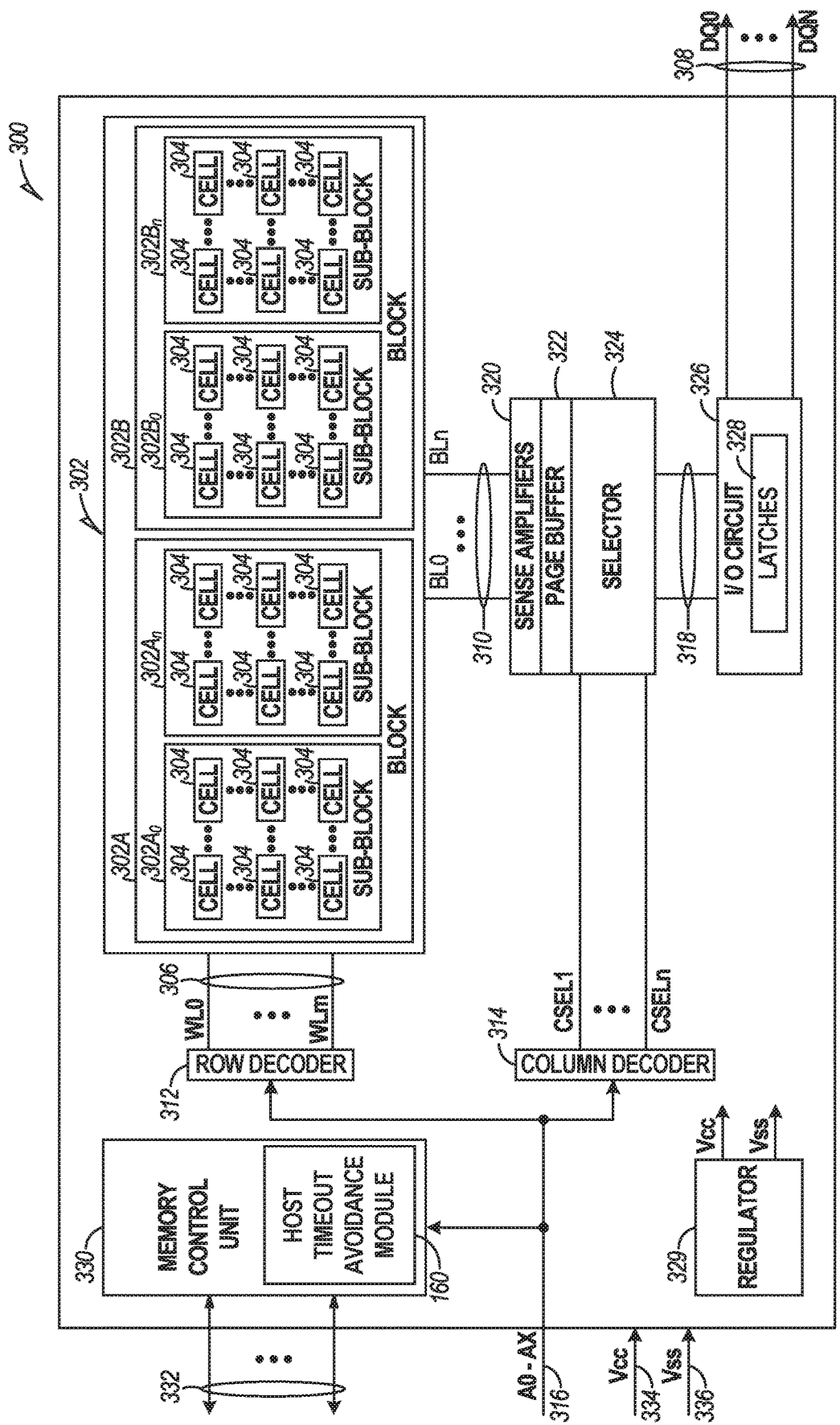
FIG. 3 illustrates an example block diagram of a memory module upon which one or more embodiments may be implemented.

FIG. 3 illustrates an example block diagram of a memory device 300 including a memory array 302 having a plurality of memory cells 304, and one or more circuits or components to provide communication with, or perform one or more memory operations on, the memory array 302. The memory device 300 can include a row decoder 312, a column decoder 314, sense amplifiers 320, a page buffer 322, a selector 324, an I/O circuit 326, and a memory control unit 330. Memory control unit 330 may correspond to memory controller 115 (FIG. 1).

The memory cells 304 of the memory array 302 can be arranged in blocks, such as first and second blocks 302A, 302B. Each block can include sub-blocks. For example, the first block 302A can include first and second sub-blocks $302A_0$, $302A_n$, and the second block 302B can include first and second sub-blocks $302B_0$, $302B_n$. Each sub-block can include a number of physical pages, with each page including a number of memory cells 304. Although illustrated herein as having two blocks, with each block having two sub-blocks, and each sub-block having a number of memory cells 304, in other examples, the memory array 302 can include more or fewer blocks, sub-blocks, memory cells, and so forth. In other examples, the memory cells 304 can be arranged in a number of rows, columns, pages, sub-blocks, blocks, and the like, and accessed using, for example, access lines 306, first data lines 310, or one or more select gates, source lines, and so forth.

The memory control unit 330 can control memory operations of the memory device 300 according to one or more signals or instructions received on control lines 332, including, for example, one or more clock signals or control signals that indicate a desired operation (e.g., write, read, erase, etc.), or address signals (A0-AX) received on one or more address lines 316. One or more devices external to the memory device 300 (e.g., a host 105, as discussed relative to FIG. 1) can control the values of the control signals on the control lines 332, or the address signals on the address line 316. Examples of devices external to the memory device 300 can include, but are not limited to, a host, a memory controller, a processor, or one or more circuits or components not illustrated in FIG. 3.

In some implementations, memory control unit 330 may include host timeout avoidance module 160. Memory control unit 330 may implement some or all of the functionality of memory controller 115 (FIG. 1). Host timeout avoidance module 160 may be configured to cause memory control unit 330 to generate and transmit a response to a host after partially performing a given memory device operation when a host timeout interval is reached (or when a timer is within a threshold of the host timeout interval).

The memory device 300 can use access lines 306 and first data lines 310 to transfer data to (e.g., write or erase) or from (e.g., read) one or more of the memory cells 304. The row decoder 312 and the column decoder 314 can receive and decode the address signals (A0-AX) from the address line 316, determine which of the memory cells 304 are to be accessed, and provide signals to one or more of the access lines 306 (e.g., one or more of a plurality of word lines (WL0-WLm)) or the first data lines 310 (e.g., one or more of a plurality of bit lines (BL0-BLn)), such as described above.

The memory device 300 can include sense circuitry, such as the sense amplifiers 320, configured to determine the values of data on (e.g., read), or to determine the values of data to be written to, the memory cells 304 using the first data lines 310. For example, in a selected string of memory cells 304, one or more of the sense amplifiers 320 can read a logic level in the selected memory cell 304 in response to a read current flowing in the memory array 302 through the selected string to the data lines 310.

One or more devices external to the memory device 300 can communicate with the memory device 300 using the I/O lines (DQ0-DQN) 308, address lines 316 (A0-AX), or control lines 332. The input/output (I/O) circuit 326 can transfer values of data in or out of the memory device 300, such as in or out of the page buffer 322 or the memory array 302, using the I/O lines 308, according to, for example, the control lines 332 and address lines 316. For example, I/O circuit 326 may include one or more latches 328 for temporarily storing data to be written to memory array 302 and data to be read by the one or more external devices from memory array 302. The page buffer 322 can store data received from the one or more devices external to the memory device 300 before the data is programmed into relevant portions of the memory array 302, or can store data read from the memory array 302 before the data is transmitted to the one or more devices external to the memory device 300.

The column decoder 314 can receive and decode address signals (A0-AX) into one or more column select signals (CSEL1-CSELn). The selector 324 (e.g., a select circuit) can receive the column select signals (CSEL1-CSELn) and select data in the page buffer 322 representing values of data to be read from or to be programmed into memory cells 304. Selected data can be transferred between the page buffer 322 and the I/O circuit 326 using second data lines 318.

The memory control unit 330 can receive positive and negative supply signals, such as a supply voltage (Vcc) 334 and a negative supply (Vss) 336 (e.g., a ground potential), from an external source or supply (e.g., an internal or external battery, an AC-to-DC converter, etc.). In certain examples, the memory control unit 330 can include a regulator 329 to internally provide positive or negative supply signals.

Figure 4:
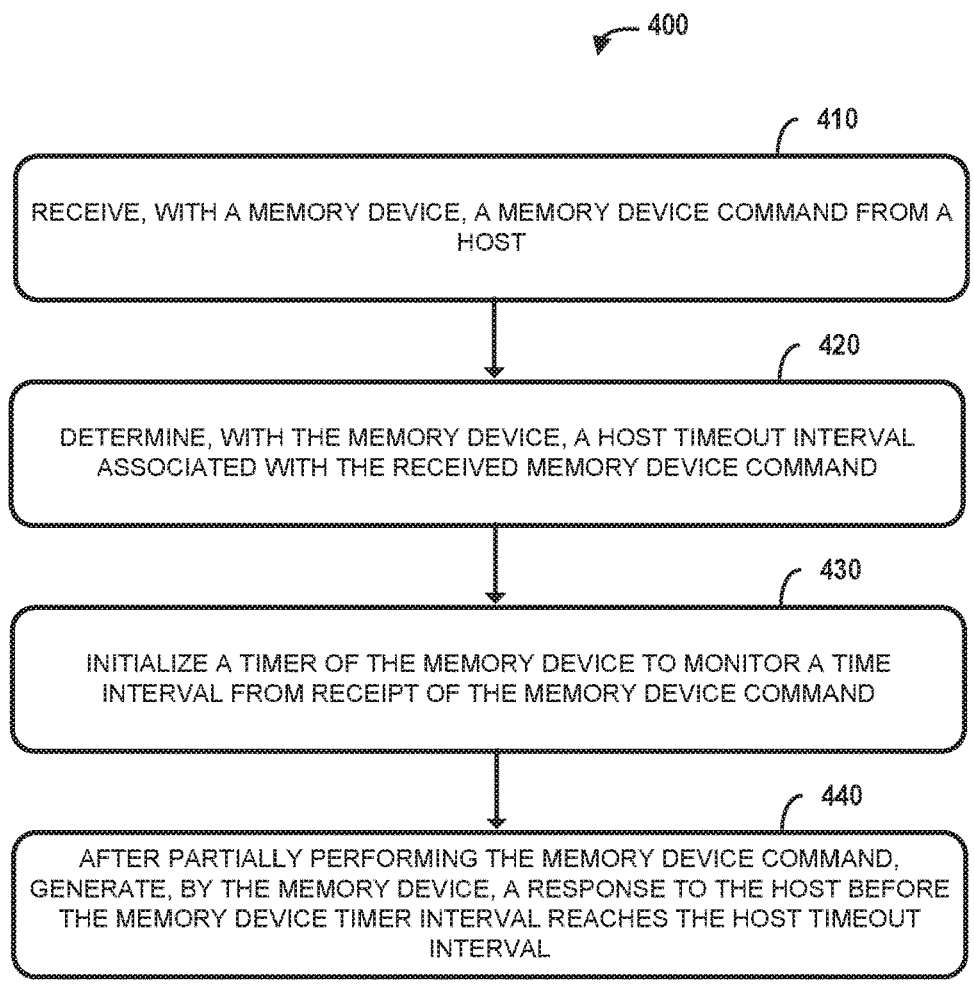
FIG. 4 is a flow chart of a process for generating a response to a host before a host timeout interval is reached after partially performing a memory device command upon which one or more embodiments may be implemented.

FIG. 4 is a flow chart of a process 400 for generating a response to a host before a host timeout interval is reached after partially performing a memory device command upon which one or more embodiments may be implemented. At 410, a memory device command is received with a memory device from a host. For example, this may be performed in the example of FIG. 2, by control circuitry 220 of host timeout avoidance module 160 receiving a multiple block (or page) read command, a single block (or page) read command, a multiple block (or page) write command, and/or a single block (or page) write command from the host 105.

At 420, a host timeout interval associated with he received memory device command is determined with the memory device. For example, this may be performed in the example of FIG. 2, by control circuitry 220 of host timeout avoidance module 160 retrieving from host timeout interval storage device 250 a previously determined host timeout interval. In some implementations, control circuitry 220 of host timeout avoidance module 160 may determine a class of the received command and may retrieve from host timeout interval storage device 250 the host timeout interval associated with the determined class of the command.

At 430, a timer of the memory device is initialized to monitor a time interval from receipt of the memory device command. For example, this may be performed in the example of FIG. 2, by control circuitry 220 of host timeout avoidance module 160 setting the target value of memory device timer 210 based on the host timeout interval retrieved from host timeout interval storage device 250 and initiating memory device timer 210. The memory device timer 210 may set the target value to be a threshold or percentage shorter than the host timeout interval retrieved from host timeout interval storage device 250.

At 440, after partially performing the memory device command, a response to the host is generated by the memory device before the memory device timer interval reaches the host timeout interval. For example, this may be performed in the example of FIG. 2, by control circuitry 220 of host timeout avoidance module 160 receiving an interrupt from the memory device timer 210 indicating that the memory device timer 210 has reached or is about to reach the target host timeout interval value set in the timer 210. In response, control circuitry 220 of the host timeout avoidance module 160 generates a given type of response for transmission to the host 105. For example, control circuitry 220 of the host timeout avoidance module 160 may transmit some but not all of the data (blocks or pages) read from the memory array of memory device 110 corresponding to the received command. For example, control circuitry 220 of the host timeout avoidance module 160 may transmit a response to the host 105 indicating that the given memory device command is still being processed. In response to receiving the response from host timeout avoidance module 160, the host 105 may avoid or may not reset the memory device 110 based on a host timeout timer reaching a given value. The host 105, in response to receiving the response from host timeout avoidance module 160, may reset the host timeout timer allowing the memory device 110 to have more time to complete processing the given memory device command.

Process 400 may be performed by any control circuitry or may be performed by dedicated circuitry (e.g., control circuitry 220 (FIG. 2)). Any step in process 400 may be performed out of the sequence represented in FIG. 4 or may be entirely omitted.

Figure 5:
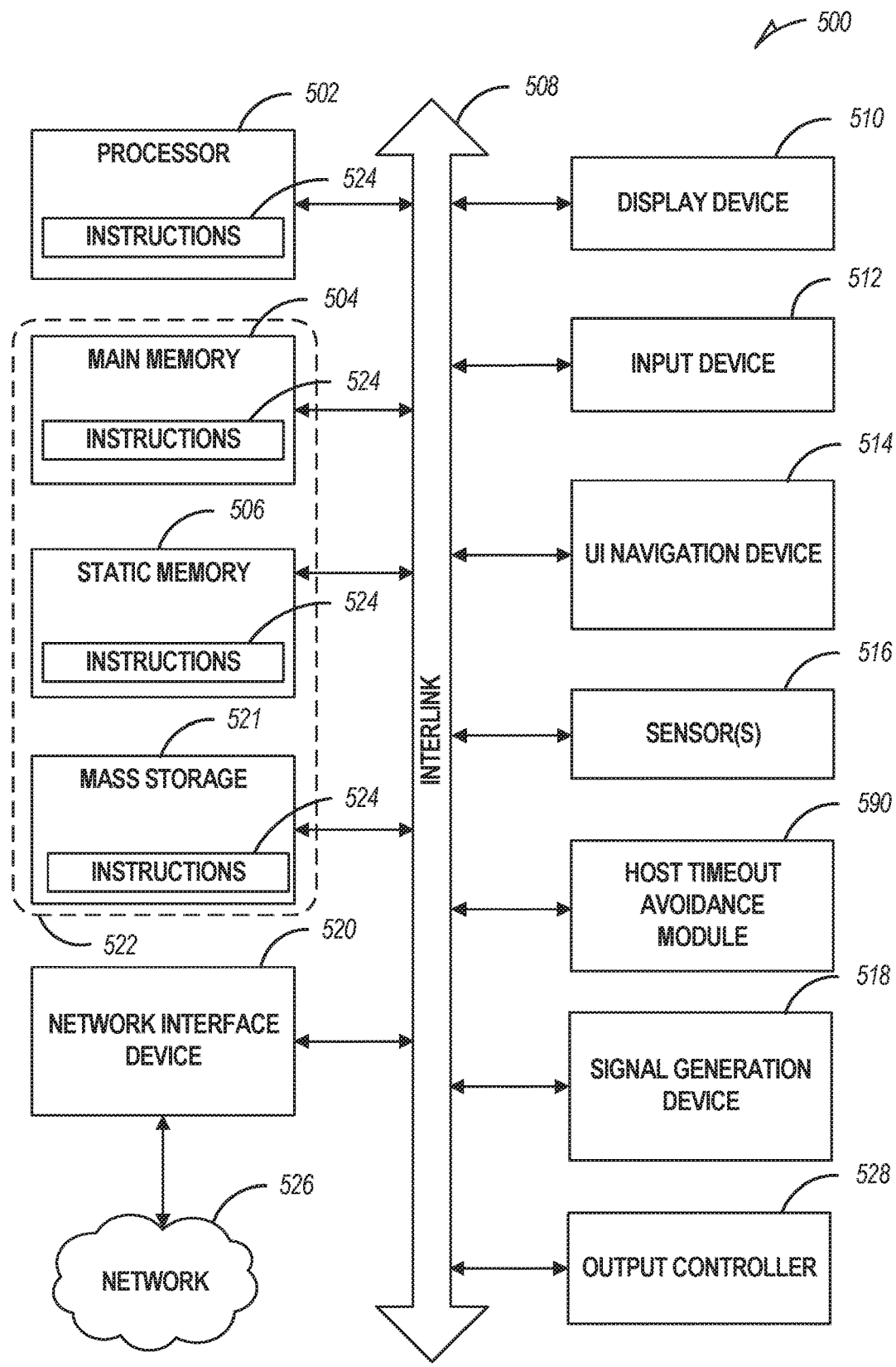
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host 105, the memory device 110, etc.) may include a hardware processor 502 (e.g., a central processing unit (CPU), a graphics processing unit (GPU), a hardware processor core, or any combination thereof, such as the memory controller 115, etc.), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512, and UI navigation device 514 may be a touch screen display. The machine 500 may additionally include a storage device (e.g., drive unit) 521, a signal generation device 518 (e.g., a speaker), a network interface device 520, one or more sensors 516, such as a global positioning system (GPS) sensor, compass, accelerometer, or other sensor, and one or more host timeout avoidance module(s) 590. Host timeout avoidance module(s) 590 may implement some or all of the functionality of host timeout avoidance module 160. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Machine readable medium 522 may include the storage device 521, main memory 504 and static memory 506. One or more sets of data structures or instructions 524 (e.g., software) embodying or utilized by any one or more of the techniques or functions described herein may be stored on storage device 521. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device may constitute the machine readable medium 522. The term "machine readable medium" may include a single medium or multiple media (e.g., a centralized or distributed database, or associated caches and servers) configured to store the one or more instructions 524.

Although depicted as a separate component in FIG. 5 from machine readable medium 522, host timeout avoidance module 590 may in some cases be embodied in any device making up machine readable medium 522, including mass storage 521, static memory 506, or main memory 504. When implemented as a separate component from machine readable medium 522, host timeout avoidance module 590 may communicate with any device in machine readable medium 522 directly via a direct dedicated connection (not shown) or via interlink 508.

The term "machine readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data stored on the storage device 521 can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage 521 device is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging takes place in the compressed block until it is necessary to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMCM devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, and so forth. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax™), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, control circuitry, a digital signal processor (DSP), or any other type of processor or processing circuit, including a group of processors or multi-core devices.

Operating a memory cell or performing a memory (or memory device) operation, as used herein, includes reading from, writing to, or erasing the memory cell or memory (or memory device). The operation of placing a memory cell in an intended state is referred to herein as "programming," and can include both writing to or erasing from the memory cell (e.g., the memory cell may be programmed to an erased state).

It will be understood that when an element is referred to as being "on," "connected to," or "coupled with" another element, it can be directly on, connected, or coupled with the other element or intervening elements may be present. In contrast, when an element is referred to as being "directly on," "directly connected to," or "directly coupled with" another element, there are no intervening elements or layers present. If two elements are shown in the drawings with a line connecting them, the two elements can be either be coupled, or directly coupled, unless otherwise indicated.

It will be understood that the term module (e.g., host timeout avoidance module) can refer to any combination of software and circuitry to perform or configured to perform the described function. Module may refer to a programmable device, non-programmable device, ASIC, PLD, FGPA, or other dedicated or specific circuitry or hardware element configured to perform the described function. Module may refer to software (e.g., computer readable instruction(s), code, or a program running on a computer or processor or control circuitry) configured to perform the described function.

Method examples described herein can be machine or computer-implemented at least in part. Some examples can include a transitory or non-transitory computer-readable medium or machine-readable medium encoded with transitory or non-transitory instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), SSDs, UFS devices, eMMC devices, and the like.

Examples

An example (e.g., "Example 1") of subject matter (e.g., a method or system) can include a method for receiving, with a memory device, a memory device command from a host; determining, with the memory device, a host timeout interval associated with the received memory device command; initializing a timer of the memory device to monitor a time interval from receipt of the memory device command; and after partially performing the memory device command, generating, by the memory device, a response to the host before the memory device timer interval reaches the host timeout interval.

In Example 2, the subject matter of Example 1 can optionally be configured such that determining the host timeout interval comprises: accessing a list of host timeout intervals each associated with a different class of memory device commands; identifying a class of the received memory device command; and retrieving, from the list, the host timeout interval associated with the identified class.

In Example 3, the subject matter of Example 2 can optionally be configured such that the class corresponds to at least one of a class of a memory device command, a size of a memory device command, and a frequency of memory device commands.

In Example 4, the subject matter of any of Examples 2-3 can optionally be configured for receiving a given memory device command at the memory device; measuring a given host timeout interval between receipt of the given memory device command at the memory device and when a host reset signal associated with the given memory device command was received at the memory device; and populating to the list of host timeout intervals the measured host timeout interval for the given memory device command.

In Example 5, the subject matter of any of Examples 1-4 can optionally be configured such that initializing the memory device timer comprises resetting the timer, further comprising: determining whether the remaining memory device timer interval is less than a threshold amount from the host timeout interval; in response to determining that the memory device timer interval is less than the threshold amount from the host timeout interval, determining whether the memory device command has been completed; and in response to determining that the timer is less than the threshold amount from the host timeout interval and in response to determining that the memory device command has not yet been completed, selecting a response type for the generated response to the host.

In Example 6, the subject matter of Example 5 can optionally be configured such that the response type is selected based on a class of the received memory device command.

In Example 7, the subject matter of Example 6 can optionally be configured for determining that the class of the received memory device command corresponds to a multi-block read operation associated with multiple memory device blocks; and generating, as the response, data read from a portion of the multiple blocks of the memory device.

In Example 8, the subject matter of any of Examples 6-7 can optionally be configured for determining that the class of the received memory device command corresponds to write operation; and generating, as the response, a status of the memory device indicating that the write operation is in progress.

In Example 9, the subject matter of any of Examples 1-8 can optionally be configured such that the response is transmitted to the host to cause the host to reset a timer of the host implementing the host timeout interval.

In Example 10, the subject matter of any of Examples 1-9 can optionally be configured such that the memory device comprises a NAND storage device.

An example (e.g., "Example 11") of subject matter (e.g., a method or system) can include a system comprising a memory device timer and control circuitry configured to receive a memory device command from a host; determine a host timeout interval associated with the received memory device command; initialize the memory device timer to monitor a time interval from receipt of the memory device command; and after partially performing the memory device command, generate a response to the host before the memory device timer interval reaches the host timeout interval.

In Example 12, the subject matter of Example 11 can optionally be configured such that the control circuitry configured to determine the host timeout interval is further configured to: access a list of host timeout intervals each associated with a different class of memory device commands; identify a class of the received memory device command; and retrieve, from the list, the host timeout interval associated with the identified class.

In Example 13, the subject matter of Example 12 can optionally be configured such that the class corresponds to at least one of a class of a memory device command, a size of a memory device command, and a frequency of memory device commands.

In Example 14, the subject matter of any of Examples 12-13 can optionally be configured such that the control circuitry is further configured to: receive a given memory device command; measure a given host timeout interval between receipt of the given memory device command and when a host reset signal associated with the given memory device command was received; and populate to the list of host timeout intervals the measured host timeout interval for the given memory device command.

In Example 15, the subject matter of any of Examples 11-14 can optionally be configured such that the control circuitry configured to initialize the memory device timer is further configured to reset the timer and is further configured to: determine whether the remaining memory device timer interval is less than a threshold amount from the host timeout interval; in response to determining that the memory device timer interval is less than the threshold amount from the host timeout interval, determine whether the memory device command has been completed; and in response to determining that the timer is less than the threshold amount from the host timeout interval and in response to determining that the memory device command has not yet been completed, select a response type for the generated response to the host.

In Example 16, the subject matter of Example 15 can optionally be configured such that the response type is selected based on a class of the received memory device command.

In Example 17, the subject matter of Example 16 can optionally be configured such that the control circuitry is further configured to: determine that the class of the received memory device command corresponds to a multi-block read operation associated with multiple memory device blocks; and generate, as the response, data read from a portion of the multiple blocks of the memory device.

In Example 18, the subject matter of any of Examples 16-17 can optionally be configured such that the control circuitry is further configured to: determine that the class of the received memory device command corresponds to write operation; and generate, as the response, a status of the memory device indicating that the write operation is in progress.

In Example 19, the subject matter of any of Examples 11-18 can optionally be configured such that the response is transmitted to the host to cause the host to reset a timer of the host implementing the host timeout interval.

In Example 20, the subject matter of any of Examples 11-19 can optionally be configured such that the memory device comprises a NAND storage device.

The subject matter of Examples 1-10 can be combined with the subject matter of Examples 11-20 and vice versa. In particular, the method of Examples 1-10 can be embodied in the memory device of Examples 11-20 and the memory device of Examples 11-20 can be operated in accordance with the method of Examples 1-10.

An example (e.g., "Example 21") of subject matter (e.g., a system or apparatus) can optionally combine any portion or combination of any portion of any one or more of Examples 1-20 to include "means for" performing any portion of any one or more of the functions or methods of Examples 1-20, or a "machine-readable medium" (e.g., non-transitory, etc.) including instructions that, when performed by a machine, cause the machine to perform any portion of any one or more of the functions or methods of Examples 1-20.

The above description is intended to be illustrative, and not restrictive. The scope of the invention should be determined with reference to the appended claims, along with the full scope of equivalents to which such claims are entitled.

The invention claimed is:

1. A method of preventing host reset commands of a memory device, the method comprising:
using one or more processors of a memory device to perform operations comprising:
receiving, a multi-block read command from a host device, the multi-block read command requesting that the memory device read multiple blocks of a memory array of a memory device;
determining a host timeout value associated with the received multi-block read command, the host timeout value being a maximum amount of time the host device waits for completion of the multi-block read command prior to sending a host reset command to the memory device, the host timeout value identified by the memory device based upon a time between receipt of a past multi-block read command and receipt of a host reset message;
initializing a timer of the memory device to monitor a time interval from receipt of the multi-block read command;
causing the multi-block read command to be executed;
determining that the timer either has expired or is within a predetermined time before expiry and the multi-block read command has not finished executing; and
responsive to determining that the timer either has expired or is within a predetermined time before expiry, and that the multi-block read command has not finished executing:
obtaining from a page buffer, data from a set of blocks already read from the memory array, the set of blocks less than a complete set of blocks specified in the multi-block read command; and
causing transmission of a response to the multi-block read command to the host device, wherein the response includes the data from the set of blocks already read from the memory array.

2. The method of claim 1, wherein determining the host timeout value comprises:
accessing a list of stored host timeout values each associated with a different class of memory device commands; and
retrieving, from the list of stored host timeout values, the host timeout value associated with the multi-block read command.

3. The method of claim 2, wherein the class corresponds to at least one of a size of a memory device command, and a frequency of memory device commands.

4. The method of claim 2 further comprising:
receiving a second multi-block read command at the memory device;
measuring a second host timeout value between receipt of the multi-block read command at the memory device and when a host reset signal associated with the second multi-block read command was received at the memory device; and
populating to the list of stored host timeout values, the measured second host timeout value for the multi-block read command.

5. The method of claim 1, wherein the response is transmitted to the host device to cause the host device to reset a timer of the host device.

6. The method of claim 1, wherein the memory device comprises a NAND storage device.

7. A memory system, comprising:
control circuitry configured to perform operations comprising:
receiving, a multi-block read command from a host device, the multi-block read command requesting that the memory system read multiple blocks of a memory array of a memory device;
determining a host timeout value associated with the received multi-block read command, the host timeout value being a maximum amount of time the host device waits for completion of the multi-block read command prior to sending a host reset command to the memory device, the host timeout value identified by the memory device based upon a time between receipt of a past multi-block read command and receipt of a host reset message;

initializing a timer of the memory device to monitor a time interval from receipt of the multi-block read command;

causing the multi-block read command to be executed;

determining that the timer either has expired or is within a predetermined time before expiry and the multi-block read command has not finished executing; and responsive to determining that the timer either has expired or is within a predetermined time before expiry, and that the multi-block read command has not finished executing:

obtaining from a page buffer, data from a set of blocks already read from the memory array, the set of blocks less than a complete set of blocks specified in the multi-block read command; and causing transmission of a response to the multi-block read command to the host device, wherein the response includes the data from the set of blocks already read from the memory array.

8. The memory system of claim 7, wherein the operations of determining the host timeout value comprise:

accessing a list of stored host timeout values each associated with a different class of memory device commands; and retrieving, from the list of stored host timeout values, the host timeout value associated with the multi-block read command.

9. The memory system of claim 8, wherein the class corresponds to at least one of a size of a memory device command, and a frequency of memory device commands.

10. The memory system of claim 8, wherein the operations further comprise receiving a second multi-block read command at the memory device;

measuring a second host timeout value between receipt of the multi-block read command at the memory device and when a host reset signal associated with the second multi-block read command was received at the memory device; and populating to the list of stored host timeout values, the measured second host timeout value for the multi-block read command.

11. The memory system of claim 7, wherein the response is transmitted to the host device to cause the host device to reset a timer of the host device.

12. The memory system of claim 7, wherein the memory system comprises a NAND storage device.

* * * * *